UNITED STATES PATENT OFFICE.

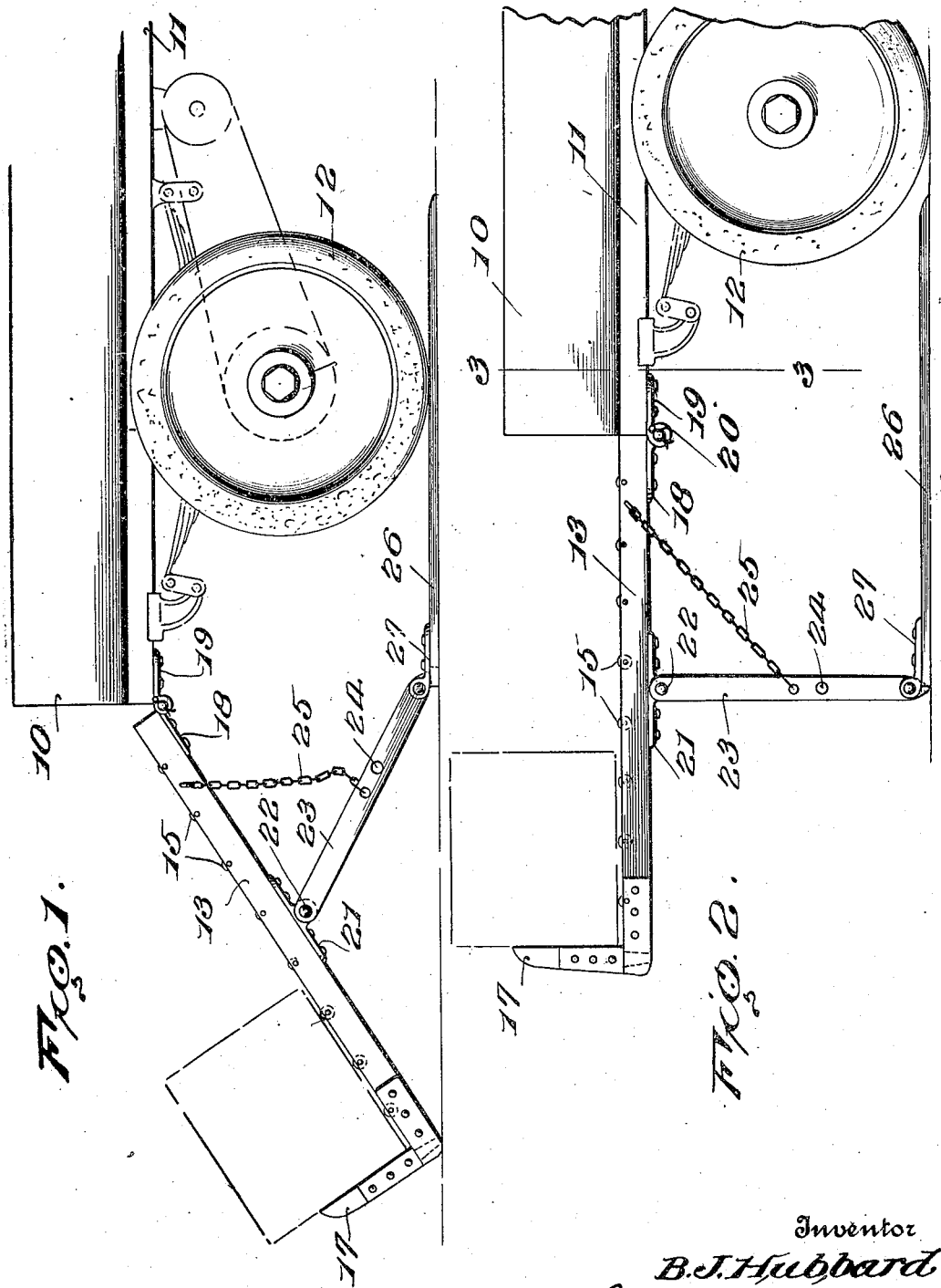

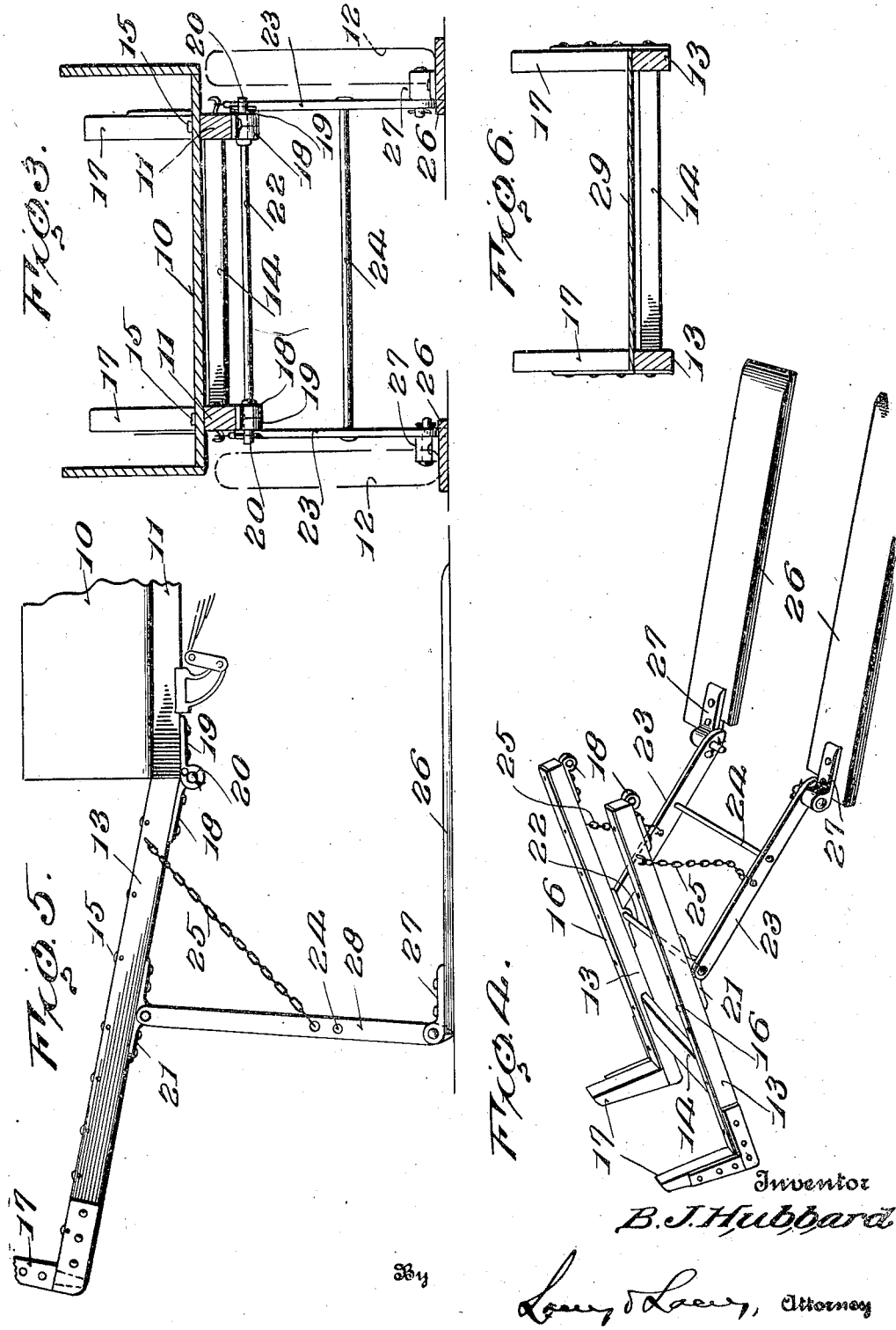

BURTT J. HUBBARD, OF KOKOMO, INDIANA, ASSIGNOR OF ONE-HALF TO JOHN THOMAS POWELL, OF PITTSBURGH, PENNSYLVANIA.

LOADING-SKID.

1,341,904.  Specification of Letters Patent.  Patented June 1, 1920.

Application filed June 29, 1918. Serial No. 242,544.

*To all whom it may concern:*

Be it known that I, BURTT J. HUBBARD, citizen of the United States, residing at Kokomo, in the county of Howard and State of Indiana, have invented certain new and useful Improvements in Loading-Skids, of which the following is a specification.

This invention relates to an improved loading skid for trucks or the like wherein the skid proper is swingingly connected to the truck and equipped intermediate of its ends with pivoted legs adapted to operatively engage the ground whereby the skid proper will be swung upwardly or lifted upon the forward movement of the truck, and has as its primary object to provide a construction for positively preventing slipping of the free ends of the legs at the ground when the truck is moved forwardly.

The invention has as a further object to provide a construction wherein the free ends of the supporting legs will be equipped with traction shoes for engagement with the ground to prevent slipping of the legs.

A still further object of the invention is to provide a skid of the above described character wherein the traction shoes will be formed to receive the rear wheels of the truck thereon so that the weight of the truck will act to hold the said shoes fixed to prevent slipping of the free ends of the legs of the skid proper when the truck is moved forwardly.

And the invention has as a still further object to provide a construction wherein the skid proper, the legs therefor, and the traction shoes may be readily folded upon each other so that the skid may be easily transported from place to place.

Other and incidental objects will appear as the description proceeds. In the drawings, wherein I have illustrated the preferred embodiment of the invention, and wherein similar reference characters designate corresponding parts throughout the several views:

Figure 1 is a fragmentary side elevation showing my improved skid connected to a conventional type of truck with the skid proper lowered for receiving a load.

Fig. 2 is a view similar to Fig. 1, showing the skid proper elevated,

Fig. 3 is a transverse sectional view taken on the line 3—3 of Fig. 2 and looking in the direction of the arrows, Fig. 4 is a perspective view showing the skid detached, Fig. 5 is a fragmentary side elevation showing a slight modification of the invention, and Fig. 6 is a transverse sectional view showing a slight modification in the construction of the skid proper.

In order that the construction, mounting and operation of my improved skid may be accurately understood, I have, in the drawings, shown the device in connection with a conventional type of motor truck having a body 10 supported by parallel longitudinal sills 11. The rear wheels of the truck are indicated at 12. However, in this regard it will, of course, be understood that while I have illustrated the use of the skid in connection with a motor truck and so describe the skid, it may, nevertheless, be used with equally effective results in connection with wagons and various other types of similar vehicles.

Coming now more particularly to the subject of the present invention, I employ a skid proper which is formed with spaced parallel skid bars 13. These bars may be constructed of wood or other approved material and adjacent their outer ends are connected by a cross brace 14. The bars may, as shown in Fig. 1, be equipped with a plurality of suitable rollers 15 projecting above the upper edges of the bars for receiving the load or, as shown in Fig. 4, may simply be equipped with wear strips 16 extending throughout the length of the bars. Removably connected with the outer ends of the bars are upstanding standards 17 braced by suitable plates secured to the side faces of the standards and the bars. These standards are designed to prevent displacement of the load at the outer end of the skid proper. Bolted or otherwise secured to the lower faces of the bars at their inner ends are hinge plates 18 adapted to mate with similar hinge plates 19 suitably secured beneath the inner ends of the sills 11 of the truck and extending through these mating plates are pivot pins 20 swingingly connecting the skid proper with the truck body. These pivot pins are preferably removable so that the skid proper may be readily detached from the truck and are held against displacement by suitable cotter pins.

Bolted or otherwise secured to the lower faces of the skid bars 13, at points substantially midway of the ends of the said bars, are oppositely disposed bearing plates 21 and rotatably fitted through these plates is a cross rod 22. Mounted upon the ends of this rod, at the outer sides of the bearing plates, are legs 23 pivotally connected with the skid proper by the said rod. Intermediate of their ends, the legs are supoprted with respect to each other by a cross brace 24, and extending between the legs and the inner extremities of the bars 13 of the skid proper are chains or other suitable flexible elements 25 adapted to limit the swinging of the legs toward the outer end of the skid proper slightly beyond vertical position.

At their lower or free extremities, the legs 23 are provided with sharpened terminals and pivotally connected with the legs at the adjacent ends thereof are companion traction shoes 26. These shoes may be formed of wood, metal, or other approved material and are elongated to extend, as particularly shown in Figs. 1 and 2, beneath the truck in alinement with the rear wheels 12 thereof. The shoes are flat and relatively wide in order that the said shoes may not only have a firm bearing upon the ground but also that the rear wheels of the truck may be readily directed thereon, and, at their outer ends, are formed with beveled terminals so that the rear truck wheels may easily ride up onto the shoes. Bolted or otherwise secured to the shoes at their inner ends are hinge plates 27 mating with the lower or free ends of the legs 23 and having the legs detachably and swingingly connected thereto by suitable pivot pins. At the inner sides of the hinge plates, the shoes are notched or cut away to receive the sharpened terminals of the legs so that the legs may thus freely swing upon the shoes.

As will now be understood, by backing the truck the rear wheels 12 thereof may be directed up onto the traction shoes 26, when the legs 23 will swing upon the said shoes for lowering the skid proper to engage at its outer end with the ground. A box or other article to be loaded may then be placed upon the skid proper when, by driving the truck forwardly, as shown in Fig. 2, the skid proper will be elevated to substantially horizontal position, when the box may be directed along the skid bars into the truck body. Thus, heavy articles of luggage or other objects may, by the motive power of the truck, be readily elevated to such position that they may be easily placed within the truck body. In this connection, particular attention is directed to the fact that when the skid proper is lowered the rear wheels of the truck will rest upon the traction shoes 26, so that these shoes will be firmly held stationary upon the ground. Consequently, when the truck starts forwardly for elevating the skid proper, the lower or free ends of the legs 23 will be firmly anchored by the said shoes so that slipping of the free ends of the shoes over the ground will be positively prevented. Thus, extremely heavy loads may be elevated upon the skid proper for removal into the truck body without likelihood of shifting of the lower ends of the legs either at the initial upward swinging of the skid proper or during its upward movement to prevent the elevation of the skid proper as the truck moves forwardly. I, therefore, provide a highly practical and efficient device and one which, while being well adapted for general application, will be found particularly desirable for use in the army service where the necessity arises for frequently loading onto auto trucks a very great volume of luggage or impedimenta transported in this manner. This is particularly true in view of the fact that, as will be seen, the legs 23 may be folded up upon the skid proper to lie along the outer sides of the skid bars 13 when the shoes 26 may then be folded over the skid proper so that the entire device will thus occupy a minimum space for easy transportation. Should it be desired to operate the device without employing the shoes 26, the shoes may be readily detached when the lower sharpened terminals of the legs 23 will engage the ground to prevent slipping of the legs when the truck is moved forwardly for elevating the skid proper. Thus, should the ground be soft so as to insure a firm purchase of the sharpened terminals of the legs therein, use of the shoes may be temporarily eliminated. The standards 17 are made detachable so that when unloading barrels or boxes, the standards may be removed and the barrels or boxes simply directed down the skid proper onto the ground.

In Fig. 5 of the drawings I have illustrated a slight modification of the invention wherein the legs 28 of the skid proper are elongated so that when swung upwardly the said legs will support the skid proper to incline downwardly toward the truck body. In order that the skid proper may assume this inclined position with respect to the truck body, the inner ends of the side bars 13 of the skid proper are, of course, suitably beveled, and, as will be seen, by thus forming the legs to support the skid proper in inclined position, material being loaded may be readily slid down the skid proper into the truck body if not of such character as to be automatically directed into the truck body upon the elevation of the skid proper. Otherwise, this modification is constructed in accordance with the preferred form of the invention and further description of the modification is accordingly believed unnecessary.

In Fig. 6 of the drawings I have shown a still further modification which relates more particularly to the construction of the skid proper. In this latter modification, a bed plate 29 is secured to the side bars 13 to extend therebetween. The presence of this plate upon the skid proper will, in many instances, facilitate the loading operation since articles upon the skid proper will tend to slide down the plate into the truck body. Otherwise, this skid proper is constructed in accordance with the preferred embodiment of the invention.

Having thus described the invention, what is claimed as new is:

1. A loading skid including a skid proper adapted for swinging connection at one end with a vehicle, fulcrum means pivotally connected with the skid proper, and traction means for anchoring said fulcrum means and supporting the fulcrum means to rock thereon, the fulcrum means being provided with pointed lower end portions and the anchoring means being freely detachable whereby the pointed lower end portions of the fulcrum means may be permitted to engage directly with the ground.

2. A loading skid including a skid proper adapted for swinging connection at one end with a vehicle, legs pivotally connected with the skid proper, and traction shoes pivotally connected with the lower end portions of said legs for anchoring the legs and supporting the legs to rock thereon, the legs being provided with pointed lower end portions and the shoes being detachable whereby the pointed lower end portions of the legs may be permitted to engage directly with the ground.

In testimony whereof I affix my signature.

BURTT J. HUBBARD. [L. S.]